(12) United States Patent
Wang et al.

(10) Patent No.: US 7,474,823 B2
(45) Date of Patent: Jan. 6, 2009

(54) TUNABLE DISPERSION COMPENSATION

(75) Inventors: Shih-Yuan Wang, Palo Alto, CA (US); Alexandre Bratkovski, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 11/581,194

(22) Filed: Oct. 12, 2006

(65) Prior Publication Data

US 2008/0089645 A1 Apr. 17, 2008

(51) Int. Cl.
*G02B 6/34* (2006.01)

(52) U.S. Cl. .............................. 385/37; 385/15; 385/27; 385/31

(58) Field of Classification Search .................. 385/15, 385/27, 31, 37
See application file for complete search history.

(56) References Cited

U.S. PATENT DOCUMENTS

| | | | |
|---|---|---|---|
| 4,996,505 A * | 2/1991 | Keilmann | 333/218 |
| 5,982,963 A | 11/1999 | Feng et al. | |
| 6,791,432 B2 | 9/2004 | Smith et al. | |
| 7,106,494 B2 | 9/2006 | Osipov et al. | |
| 2004/0161197 A1 | 8/2004 | Pelletier et al. | |
| 2005/0191774 A1 | 9/2005 | Li et al. | |
| 2006/0044212 A1 | 3/2006 | Wang et al. | |
| 2006/0066493 A1 | 3/2006 | Wang | |
| 2006/0109541 A1 | 5/2006 | Osipov et al. | |
| 2006/0110165 A1 | 5/2006 | Seguineau et al. | |

FOREIGN PATENT DOCUMENTS

| WO | WO03044897 A1 | 5/2003 |
|---|---|---|
| WO | WO2005003830 A2 | 1/2005 |

OTHER PUBLICATIONS

Cheng, C. et. al., "Tailoring double-negative responses . . . anomalous propagation along microstrip . . . ," IEEE Trans Microw.Theory Tech., vol. 51, No. 12, pp. 2306-2314, (Dec. 2003).
Jaksic, Z., et al., "Negative refractive index metamaterials: principles and apps," Mikrotalasna revija, pp. 35-49, (Jun. 2006).
Joseph, E., et al., "Opt. charact. poly-dimethyl siloxane (PDMS) . . . coupled plasma processing . . . PDMS-based photo. crystal," presented 2003 AVS Conf.,Baltimore (Nov. 2-7, 2003).
Joseph, E., et. al., "Optical charact. poly-dimethyl siloxane (PDMS) during inductively coupled plasma processing . . . PDMS-based photonic crystal," presented ECS Talent Show.

* cited by examiner

*Primary Examiner*—Jennifer Doan (57) ABSTRACT

Dispersion compensation for an optical signal having a first frequency range is described. The optical signal is applied to a dispersion compensating material having a negatively refracting behavior within the first frequency range. The dispersion compensating material is tuned by application of a control signal that varies at least one characteristic of the dispersion compensating material associated with the negatively refracting behavior.

20 Claims, 4 Drawing Sheets

TUNABLE DISPERSION COMPENSATION

FIELD

This patent specification relates to optical communications and, more particularly, to dispersion compensation for optical communications.

BACKGROUND

Fiber optic communication involves modulating optical signals at high bit rates and transmitting the modulated optical signals over optical fibers. For example, in a wavelength division multiplexed (WDM) fiber optic communications system, optical carrier signals at a sequence of distinct wavelengths are separately modulated by information channels and then multiplexed onto a single optical fiber. Efforts continue toward increasing the data capacity of fiber optic communications systems, as well toward increasing the practical transmission distance of fiber optic spans. Although the development of erbium-doped fiber amplifiers (EDFAs) has substantially eliminated optical fiber attenuation as an obstacle to achieving longer transmission distances, other adverse effects suffered by optical fibers continue to serve as limitations on achievable bandwidths and/or distances.

Chromatic dispersion, termed dispersion herein, is one effect that limits the performance of an optical fiber span. Dispersion refers to a loss of signal shape as different component wavelengths travel down the optical fiber at different speeds. In practice, dispersion effects limit the rate at which a light beam at a given wavelength may be modulated with information (thereby limiting system throughput), and limit the allowable spacing between regenerators in a fiber optic communications link (thereby increasing system cost). For one widely used type of single mode fiber, the dispersion is about 17 ps/nm/km at a typical WDM wavelength near 1500 nm, wherein light at a wavelength of 1500 nm travels down the fiber 17 ps/km faster than light at a wavelength of 1501 nm, and travels down the fiber 17 ps/km slower than light at a wavelength of 1499 nm. Because the dispersion value for an optical fiber is usually dependent on signal wavelength, the dispersion characteristic for any particular type of optical fiber is often expressed as a plot of dispersion versus wavelength.

Dispersion compensating fibers (DCFs) are often used to compensate for the dispersive effects of optical fibers. Because of a core diameter much smaller than that of an ordinary optical fiber, the dispersion characteristic of a typical DCF is highly negative. When placed after (or before) the optical fiber span, the highly negative dispersion of the DCF compensates (or pre-compensates) for the positive dispersion of the optical fiber, thereby restoring the signal shape. Issues that arise for many DCFs include limitations on the amount of dispersion compensation per unit length, the high attenuation caused by the narrow core, and tunability limitations.

Chirped fiber Bragg gratings (chirped FBGs) can also be used for dispersion compensation. Chirped FBGs comprise segments of optical fiber into which lengthwise periodic variations of refractive index are "written" or burned, the periodic variations being chirped between longer periods at a first end and shorter periods at the opposite end. In operation, the chirped FBG receives the optical signal at the first end, and then reflects the wavelengths of interest back out that same first end, the shorter wavelengths being delayed relative to the longer wavelengths, thereby achieving a highly negative dispersion to compensate for the positive dispersion of the fiber span. Issues that arise for many chirped FBGs include the lengths of FBG fiber needed to provide dispersion compensation over a sufficiently wide spectral bandwidth, difficulty of fabrication, sensitivity to thermal variations, tunability limitations, and group delay ripple that can be a source of system noise.

It would be desirable to provide dispersion compensation in a manner that avoids, addresses, or improves upon one of more of the above-described issues associated with DCFs and chirped FBGs. Other issues arise as would be apparent to one skilled in the art upon reading the present disclosure.

SUMMARY

In accordance with an embodiment, a method of compensating for dispersion in an optical signal having a first frequency range is provided, comprising applying the optical signal to a dispersion compensating material having a negatively refracting behavior within the first frequency range. The method further comprises tuning the dispersion compensating material by applying a control signal that varies at least one characteristic of the dispersion compensating material associated with the negatively refracting behavior.

Also provided is an apparatus for dispersion compensation for an optical signal having a first frequency range, comprising a dispersion compensating material having a negatively refracting behavior within the first frequency range, and a controller for applying a control signal to the dispersion compensating material. At least one characteristic of the dispersion compensating material associated with the negatively refracting behavior is affected by the control signal such that the dispersion compensation is tunable according to the control signal.

Also provided is a tunable device for compensating dispersion in an optical signal propagated through a dispersive medium, the optical signal having a first frequency range, the dispersive medium having a first dispersion characteristic over the first frequency range. The tunable device comprises a dispersion compensating material that, within the first frequency range, exhibits a negatively refracting behavior and has a second dispersion characteristic of opposite sign and substantially greater magnitude than the first dispersion characteristic. The tunable device further comprises means for dynamically controlling at least one property of the dispersion compensating material associated with the negatively refracting behavior. The dynamic controlling of this at least one property operatively tunes the second dispersion characteristic of the dispersion compensating material.

DETAILED DESCRIPTION

Figure 1:
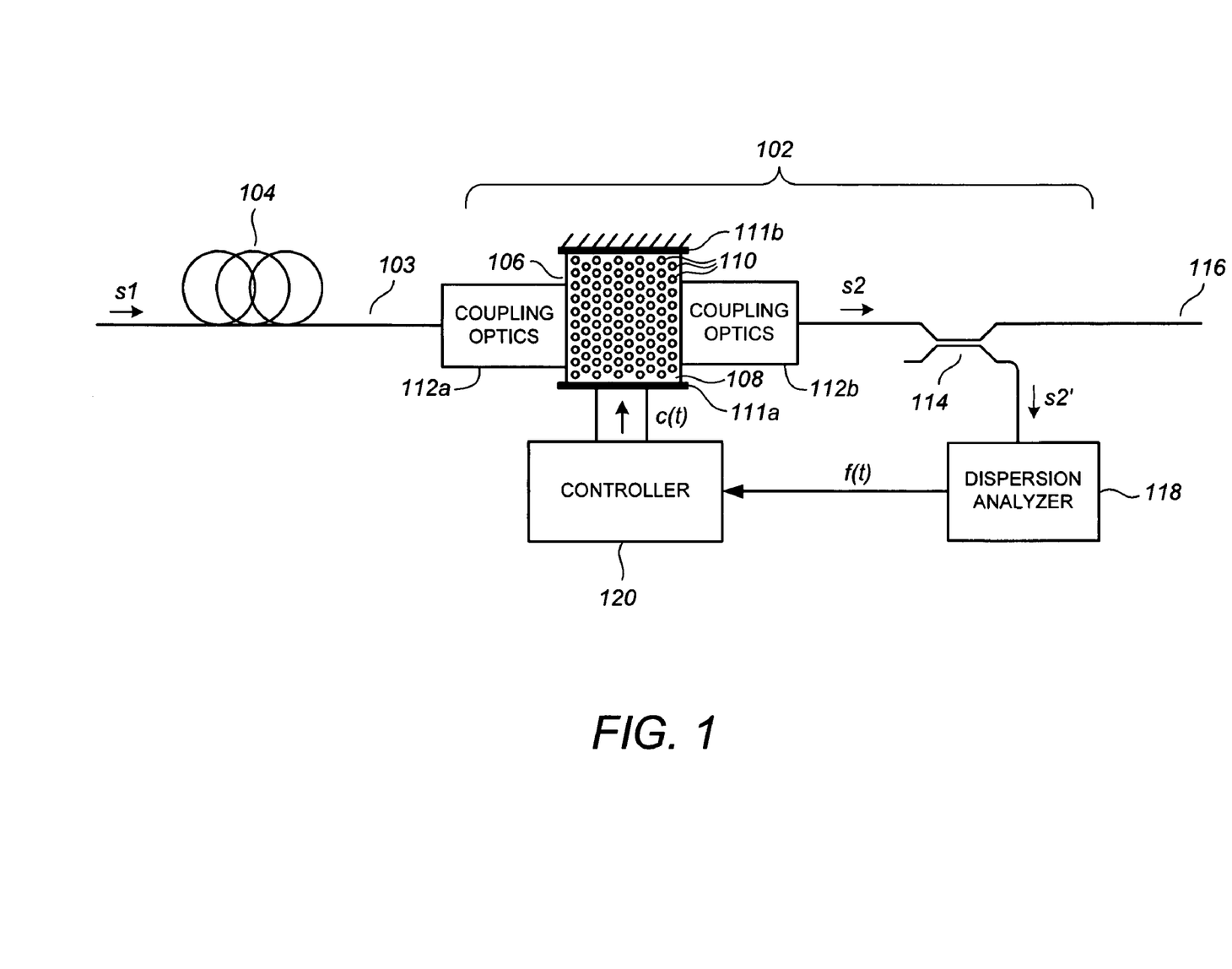
FIG. 1 illustrates a dispersion compensating apparatus according to an embodiment.

FIG. 1 illustrates a dispersion compensating apparatus 102 according to an embodiment. An optical signal s1 propagates through a dispersive medium such as an optical fiber span 104 and is received at an input 103 to the dispersion compensating apparatus 102. The dispersion compensating apparatus 102 comprises a dispersion compensating material, which in the embodiment of FIG. 1 is a photonic crystal 106, along with coupling optics 112a and 112b that couple the optical signal into and out of the photonic crystal 106, respectively, to provide a dispersion compensated signal s2. The coupling optics 112a and 112b are designed to be of negligible effect relative to the spectral content and dispersion characteristics of the optical signal. The particular structures for the coupling optics 112a and 112b would be readily achievable by one skilled in the art in view of the present disclosure.

The dispersion compensating apparatus 102 further comprises a coupler 114, such as a resonant coupler, that extracts a portion s2' of the dispersion compensated signal s2 and provides it to a dispersion analyzer 118, the non-extracted portion proceeding to the output 116, which may couple to a terminal device, a subsequent fiber optic span, etc. Because s2, s2', and the signal at the output 116 are just scaled versions of each other, a measure of residual dispersion in the extracted portion s2' directly corresponds to the amount of residual dispersion in the dispersion compensated signal s2 and the signal at the output 116.

The dispersion analyzer 118 is configured to receive the extracted portion s2' and generate therefrom a feedback signal f(t) at least partially representative of an amount of residual dispersion in the dispersion compensated signal s2. Dispersion analyzers are known in the art and the dispersion analyzer 118 would be achievable by one skilled in the art in view of the present disclosure. In a simplest example, the dispersion analyzer 118 can comprise an amplitude measurement circuit that measures an amplitude of a pilot clock signal, the amplitude deteriorating as residual dispersion increases and increasing as residual dispersion decreases. In a more complex example, the dispersion analyzer 118 can comprise a bit error rate detector that operates based on a known pilot signal and/or a known error correction scheme, and generate an output that rises as the bit error rate rises and falls as the bit error rate falls. Notably, it is not required that absolute measurement of the residual dispersion be achieved, but rather relative amounts can be used for generation of the feedback signal f(t). Any of a variety of different residual dispersion measurement schemes, either relative or absolute, can be used without departing from the scope of the present teachings.

The dispersion compensating apparatus 102 further comprises a controller 120 configured to receive the feedback signal f(t) and apply a control signal c(t) to the photonic crystal 106 that varies at least one characteristic thereof associated with a negatively refracting behavior thereof. Depending on the particular type of negatively refracting material used as the dispersion compensating material, the control signal c(t) can include, but is not limited to, mechanical stress, mechanical strain, an electrostrictive actuation signal, a magnetostrictive actuation signal, a piezoelectric actuation signal, an electromagnetic actuation signal, an electromechanical actuation signal, and a microfluidic actuation signal. According to one embodiment, the control signal c(t) is varied by the controller 120 in a manner that reduces an amount of residual dispersion in the dispersion compensated signal s2. Many different control strategies and/or transfer functions relating the functions f(t) and c(t) are within the scope of the embodiments, and would be readily realizable by a person skilled in the art in view of the present teachings.

According to an embodiment, the photonic crystal structure 106 is selected, configured, and dimensioned to exhibit negatively refracting behavior across a frequency range that includes the wavelengths of the WDM signal for which dispersion compensation is desired. According to an embodiment, the highly dispersive nature of a photonic crystal within its negatively refracting regime around its resonant frequency is harnessed to provide a strong dispersion compensation capability for an optical communications link. Moreover, because the negatively refracting behavior of a photonic crystal is sensitive to external perturbations to the photonic crystal, the dispersive characteristics associated with that negatively refracting behavior are also highly controllable in a timewise sense by controlled application of those external perturbations. According to an embodiment, tunability of the dispersion compensation, either static or dynamic, is provided by such controlled application of external perturbations.

According to another embodiment, the dispersion compensating material comprises, as an alternative to a photonic crystal structure or in conjunction therewith, an arrangement of electromagnetically reactive cells of small dimension relative to a wavelength of the optical signal configured to exhibit a negative effective permittivity and a negative effective permeability within the frequency range of the WDM signals. According to an embodiment, the highly dispersive nature of so-called composite materials, often termed metamaterials, within their negatively refracting regimes near their resonant frequencies are harnessed to provide strong dispersion compensation for optical communications links. Likewise, as with photonic crystals, because the negative index characteristics of such composite materials are also sensitive to external perturbations, their dispersive characteristics are also timewise controllable by controlled application of such external perturbations, thereby also providing for tunable dispersion compensation.

According to yet another embodiment, the dispersion compensating material comprises, as another alternative, a population of electrically conductive nanostructures disposed in a matrix material, the electrically conductive nanostructures being at least partially random with respect to size, shape, orientation, and/or location, and being sufficiently small relative to the wavelength range of interest (e.g., 1/50 of the wavelength or less) such that negative index behavior is achieved for the frequency range for which dispersion compensation is desired. Examples of composite materials suitable for use in conjunction with the present teachings are described further infra with respect to FIGS. 5, 6, and 7.

For another embodiment applicable for both negatively refracting photonic crystals and negative index composite materials, the dispersion compensating material comprises at least partially reflective end facets angularly oriented relative to the optical signal such that the optical signal traverses back and forth a plurality of trips across the dispersion compensating material before exiting. For a particular desired amount of dispersion compensation, the overall length of the dispersion compensating material can be shortened accordingly.

Returning now to the photonic crystal example of FIG. 1, the photonic crystal 106 comprises a slab 108 of a first dielectric material periodically patterned with a second dielectric material 110, the periodic pattern comprising features that are relatively small compared to a wavelength of the optical signal and configured to result in negatively refractive behavior within the frequency range of the WDM signals. Characteristics associated with negatively refracting behavior in photonic crystals include, but are not limited to, the period of the lattice spacing, the size of the patterned features, the shape of the patterned features, the dielectric constants of the first and second dielectric materials, and the thickness of the dielectric slab 108. Perturbations to one or more of these characteristics can induce substantial changes in the negatively refracting behavior and, therefore, the dispersion characteristics of the photonic crystal 106.

By way of example, the first dielectric slab 108 may comprise an at least partially flexible material having acceptable attenuation at WDM wavelengths near 1500 nm, such as poly-dimethyl siloxane (PDMS) with a thickness of about 0.3 $\mu m$. The second dielectric material may comprise posts of crystalline silicon having a diameter of 0.37 $\mu m$ arranged into a rectangular lattice with a lattice constant of 0.62 $\mu m$. The PDMS slab 108 may be positioned between or placed across two rigid plates 111a and 111b whose spacing is mechanically adjusted according to a mechanical and/or acoustic control signal c(t), the induced deformation affecting at least the thickness and the average lattice spacing. The particular dimensional changes needed to tune the dispersion characteristic are usually at least partially device dependent but would be readily determinable empirically and/or by computer simulation without undue experimentation by a person skilled in the art in view of the present disclosure.

For one embodiment, one of the first and second dielectric materials of the photonic crystal 106 may comprise a photorefractive material, such as a photopolymer or a photosensitive glass. For this embodiment, the external control signal c(t) is an optical control signal cast across the upper or lower surface of the photonic crystal, usually of a relatively high power compared to the power of the propagating WDM optical. Even small variations in the dielectric constants of the first and/or second dielectric material can substantially alter the negatively refractive behavior and, therefore, the dispersion characteristic to achieve tuning of the dispersion characteristic.

In still another embodiment, liquids and/or gases can be used as the second dielectric material 110, and the control signal c(t) can be microfluidic in nature. Generally speaking, optical control mechanisms are more appropriate where faster response times are desired, whereas mechanical or hydraulic control mechanisms are usually suitable only where static, quasi-static, or low frequency control is desired, although both these and a variety of other control mechanisms are within the scope of the embodiments. In other embodiments, the photonic crystal 106 is similar to one or more of those described in the commonly assigned US 2005/0191774A1, which is incorporated by reference herein.

According to another embodiment, the photonic crystal 106 comprises a gain material (not shown) for providing one of net gain and reduced loss for the optical signal propagating therethrough. An external electrical power signal is applied for cases in which the gain material is electrically pumped. For optically pumped gain material, an external optical power signal different than the control signal c(t) and the propagating optical signal is applied to power the gain material. The electrical and/or optical pump powers may also have the additional effect of perturbing the negatively refractive behavior of the photonic crystal 106, and therefore may also serve as a means, in addition to the other applied control signal c(t), of tuning the dispersion characteristic of the photonic crystal 106. As such, the external power signal and the control signal c(t) could potentially merge into a common signal (i.e., the control signal c(t) also serving as the gain material pump source) without departing from the scope of the present teachings.

For one embodiment, the photonic crystal 106 comprises a semiconductor-based photonic bandgap medium having active layers similar to those used in semiconductor optical amplifiers (SOAs), edge-emitting lasers, vertical cavity surface emitting lasers (VCSELs), or similar devices. The active layers can include bulk active material and/or multi-quantum well structures based, for example, on III-V material systems. In one embodiment particularly relevant at WDM wavelengths, the active layer comprises a multi-quantum well (MQW) structure according to an InP/InGaAsP/InGaAs material system. For another embodiment, the photonic crystal 106 comprises a glass-based photonic bandgap medium and the gain medium comprises an erbium-doped glass material similar to that used in erbium-doped fiber amplifiers (EDFAs), or other rare-earth-doped glass material, the external power being provided to the gain medium using a free-space beam of pump light. In other embodiments, the photonic crystal 106 is similar to one or more of those described in the commonly assigned US 2006/0066493A1, which is incorporated by reference herein.

Figure 2:
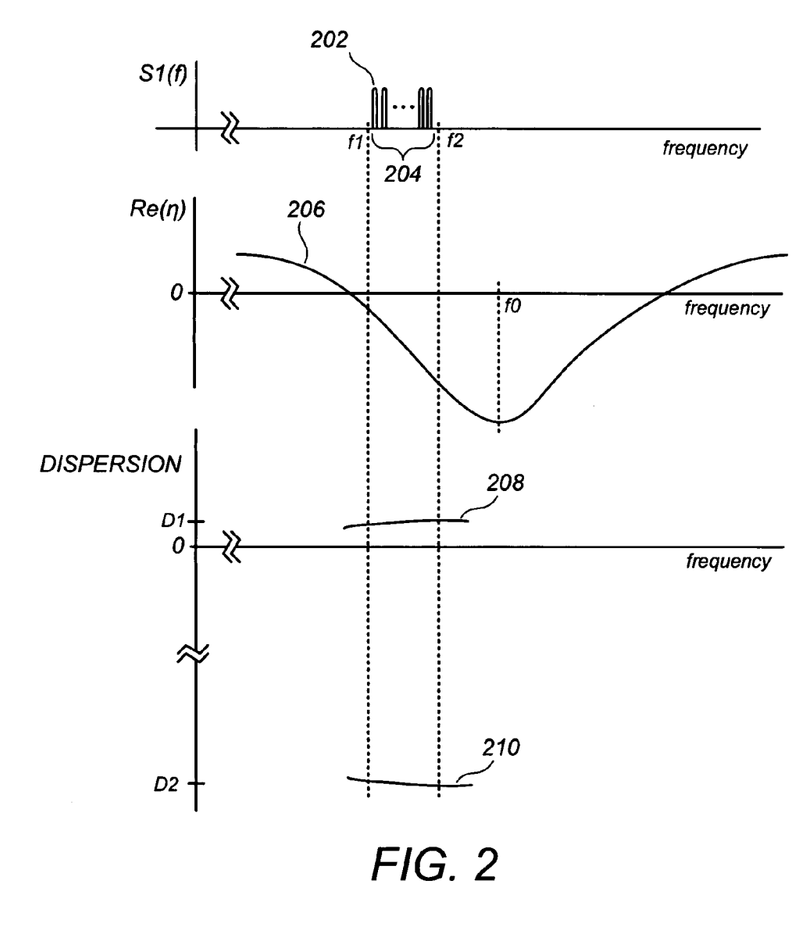
FIG. 2 illustrates a signal frequency characteristic, an effective index characteristic, and dispersion characteristics associated with the dispersion compensating apparatus of FIG. 1 according to an embodiment.
Figure 3:
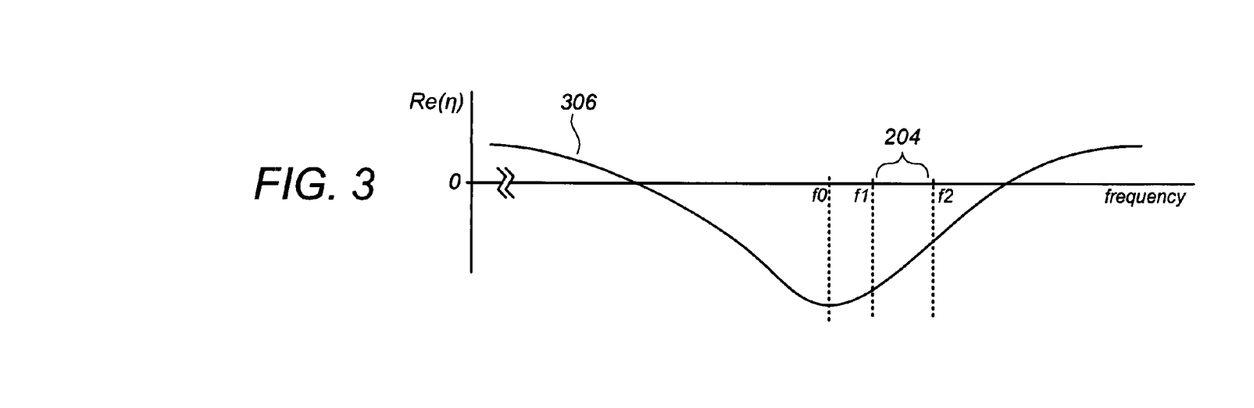
FIG. 3 illustrates an effective index characteristic associated with the dispersion compensating apparatus of FIG. 1 according to an embodiment.

FIGS. 2-3 illustrates plots of enumerated signals and/or quantities associated with the operation of a dispersion compensating apparatus according to an embodiment, with reference to the example of FIG. 1. It is to be appreciated that the present teachings as reflected in FIGS. 2-3 are generally applicable for both photonic crystals and negative index metamaterials. Shown in FIG. 2 is a plot 202 of a frequency spectrum $S1(f)$ of the WDM optical signal $s1(t)$, illustrating a frequency range 204 between f1 and f2 for which dispersion compensation is desired. By way of example only, and not by way of limitation, and expressed in somewhat more familiar terms of free-space wavelength, the frequency range 204 may correspond to the free-space wavelength range of 1500 nm-1510 nm.

Also shown in FIG. 2 is a plot 206 representative of an effective refractive index of the dispersion compensating material which, according to an embodiment, is configured and dimensioned to be negatively refracting across a frequency range that encompasses the frequency range 204, but is configured and dimensioned such that a resonant frequency f0 thereof lies outside the frequency range 204. Generally speaking, due to inflective behaviors experienced at the resonant frequency f0, it is preferable for the frequency range 204 to be on one side or the other of the resonant frequency f0, but not straddling the resonant frequency f0. In the embodiment of FIG. 2, the frequency range 204 lies below the resonant frequency f0. Shown in FIG. 3 is a plot 306 representative of an effective refractive index according to another embodiment in which the frequency range 204 (i.e., the frequency range for which dispersion compensation is desired) lies above the resonant frequency f0.

Also shown in FIG. 2 are plots 208 and 210 representing dispersion characteristics of the optical fiber span 104 and the dispersion compensating material (i.e., the negatively refracting photonic crystal or composite material), respectively, according to a preferred embodiment. As illustrated, due to the highly dispersive nature of photonic crystals and composite materials in their negatively refracting regimes near their resonant frequencies, the dispersion characteristic 210 can be caused to have an opposite sign and a substantially greater magnitude than the dispersion characteristic 208, such that dispersion compensation can be achieved with a relatively modest length of the photonic crystal/composite material. By way of example, whereas the optical fiber dispersion D1 is often about +17 ps/nm/km near the 1500 nm wavelength, the dispersion D2 of the dispersion compensating material can be as negative as −2000 ps/nm/km, −20000 ps/nm/km, and even more negative as dictated by the particular selection of materials, control signals, and wavelengths.

Advantageously, the use of closed-loop feedback as shown in FIG. 1 can be used to dynamically shift, raise, lower, adjust, or otherwise optimize the dispersion compensation characteristic 210 for the best achievable performance. It is to be appreciated that the provided tuning capabilities can alternatively be static (e.g., once during system setup or at periodic maintenance intervals) or quasi-static, or can be dynamically responsive to a non-feedback signal (e.g., in a modulative context), without departing from the scope of the present teachings.

Figure 4:
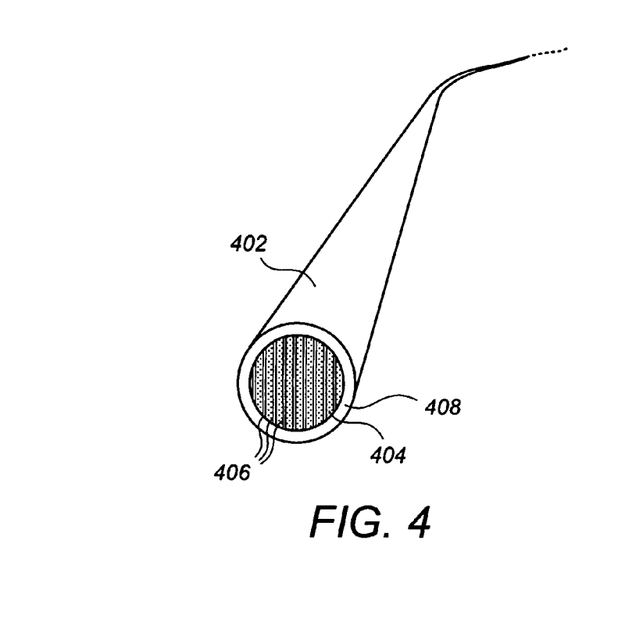
FIG. 4 illustrates a dispersion compensating material according to an embodiment.

FIG. 4 illustrates a photonic crystal fiber 402 that may be used as a controllable dispersion compensating material according to an embodiment. The photonic crystal fiber 402 comprises a glass core material 404 into which holes 406 are formed, such as by using a focused ion beam milling process, and filled with air, fluid, or other material having a dielectric constant substantially different to that of glass. A low-index cladding 408 such as Teflon is wrapped around the core. A negatively refractive behavior of the photonic crystal fiber 402 can be controlled using strain tuning, for example. Alternatively, one or more of the above-described control methods can be used, such as optical control of a photorefractive material contained in the holes 406.

Figure 5:
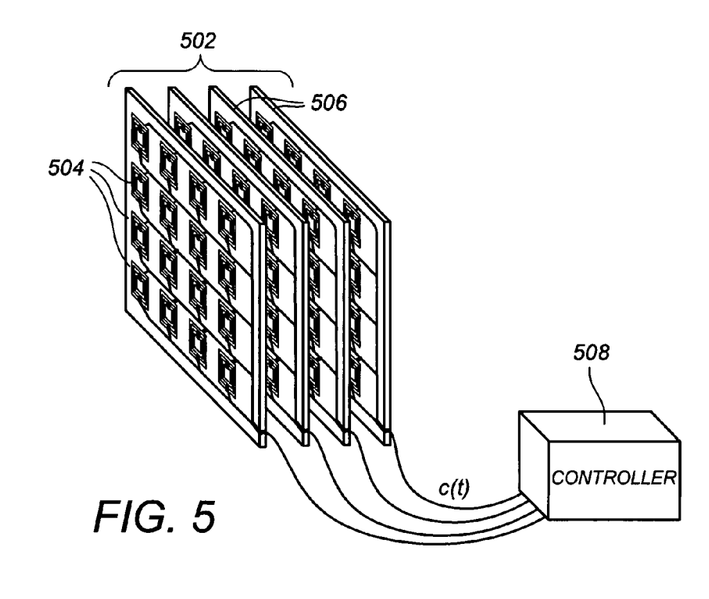
FIG. 5 illustrates a dispersion compensating material according to an embodiment.

FIG. 5 illustrates an example of a controllable composite material 502 that can be used as a controllable dispersion compensating material according to an embodiment. The composite material 502 comprises multiple backplanes 506 supporting an arrangement of electromagnetically reactive cells 504 of small dimension relative to a wavelength of the optical signal, and is configured to exhibit a negative effective permittivity and a negative effective permeability within the frequency range of the WDM signals for which dispersion compensation is desired. Where the desired operating wavelength lies near 1500 nm, the electromagnetically reactive cells 504 should be less than about 300 nm across, with better performance being exhibited where that dimension is about 150 nm or less.

Characteristics associated with negative index or negatively refracting behavior in the composite material 502 include, but are not limited to, the period and layout of the arrangement of electromagnetically reactive cells 504, the shape and resonance characteristics of the electrical conductors within the electromagnetically reactive cells 504, the conductivity of the electrical conductors, the permittivity and permeability of the material used in the backplanes 506, the density of carriers (if any) present near the electromagnetically reactive cells 504, and the characteristics of gain material (if any) present near the electromagnetically reactive cells 504. According to one embodiment, the electromagnetically reactive cells 504 have at least one of an inductive and a capacitive property that is controllable according to a control signal c(t) applied by a controller 508, the controller 508 being coupled to receive the feedback signal f(t) from the dispersion analyzer 108 of FIG. 1, supra. For one embodiment, the electromagnetically reactive cells 504 comprise split-ring resonators, the control signal c(t) is an optical signal, and the backplanes comprise an optically responsive doped semiconductor material near the split-ring resonators, wherein variations in an electrical carrier population caused by application of the optical signal c(t) provide for dynamic control of the inductive or capacitive property. In other embodiments, the composite material 502 and control signals applied thereto are similar to one or more of those described in the commonly assigned U.S. Pat. No. 7,106,494, which is incorporated by reference herein.

According to another embodiment, gain material such as bulk active InGaAsP and/or multiple quantum wells according to a InGaAsP/InGaAs/InP material system are provided near the gaps of the split-ring resonators, for providing gain and/or reduced loss to the optical signal propagating through the composite material 502. The gain material can be externally powered by optical and/or electrical power signals. In a manner analogous to the discussion supra for photonic crystals, the external power signals and the control signal c(t) could potentially merge into a common signal (i.e., the control signal c(t) also serving as the gain material pump source) without departing from the scope of the present teachings. The electromagnetically reactive cells 504 can comprise any of a variety of metallic shapes and patterns known to provide the required resonant behavior including, but not limited to, circular split ring resonators, square split ring resonators, and swiss rolls. In other embodiments, the composite material 502 and control signals applied thereto are similar to one or more of those described in the commonly assigned US 2006/0044212A1, which is incorporated by reference herein.

Figure 6:
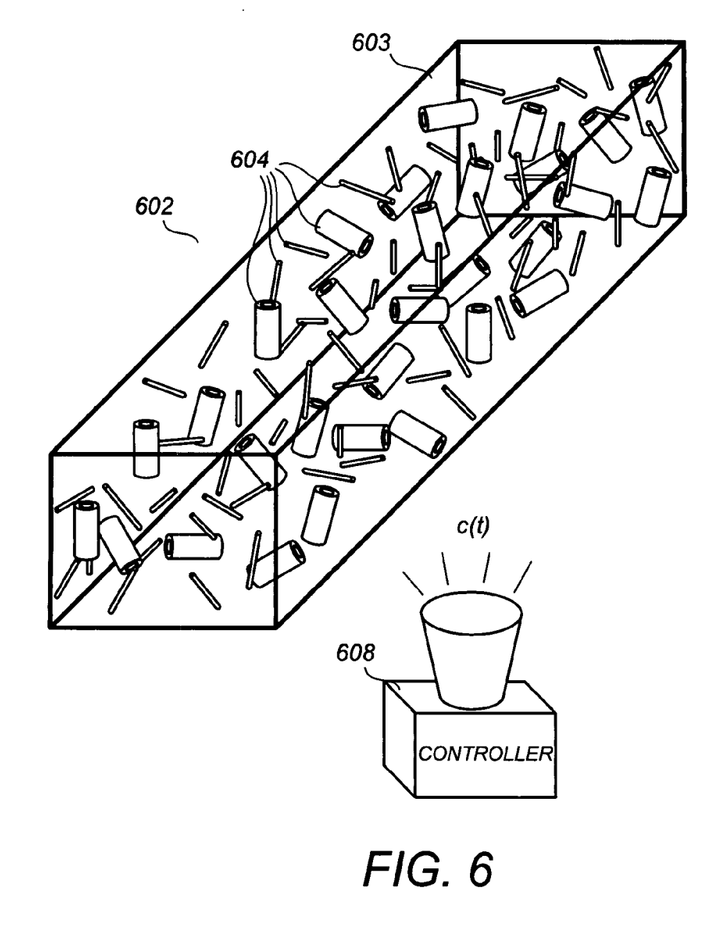
FIG. 6 illustrates a dispersion compensating material according to an embodiment.

FIG. 6 illustrates an example of a controllable composite material 602 that can be used as a controllable dispersion compensating material according to an embodiment. The composite material 602 comprises arrangements of electrically conductive nanostructures 604 disposed in a matrix material 603, the electrically conductive elements being substantially random, partially random, or quasi-random with respect to size, shape, orientation, and/or location. The electrically conductive nanostructures are sufficiently populous and sufficiently small relative to the wavelength range of interest (e.g., 1/50 or less) such that negative index behavior is achieved for the frequency range for which dispersion compensation is desired. Thus, for a typical WDM wavelength of 1500 nm, the minor dimensions of the electrically conductive nanostructures should not be greater than about 30 nm, and even stronger negative index behavior can be achieved for even smaller nanostructures.

Characteristics associated with negative index or negatively refracting behavior in the composite material 602 include, but are not limited to, the density of the conductive nanostructures 604, the size and shape of the conductive nanostructures 604, the orientations of the conductive nanostructures 604, the conductivity of the conductive nanostructures 604, the permittivity and permeability of the matrix material 603, and the characteristics of gain material (if any) present in the matrix material 603. According to one embodiment, the matrix material 603 at least partially comprises a photorefractive material (not shown) distributed therethroughout, such that variations in the negative index behavior can be induced and the dispersion characteristic tuned by application of external control light c(t) provided a controller 608, the controller 608 being coupled to receive the feedback signal f(t) from the dispersion analyzer 108.

According to another embodiment, a gain material such as quantum dots (not shown) is distributed throughout the matrix material 603 for providing gain and/or reduced loss for the optical signal propagating through the composite material 602. The gain material can be externally powered by an optical power source and, as with the embodiments supra using the composite material 502 and photonic crystal 106, the control signal c(t) can actually also serve a dual purpose as both a control signal and an optical power source under the right conditions, which can be determined empirically and/or by simulation. Any of a variety of other tuning mechanisms, such as mechanical force to change a dimension of the composite material 602, and other tuning mechanisms described supra for photonic crystals and the composite material 502 of FIG. 5, are also within the scope of the present teachings.

Figure 7:
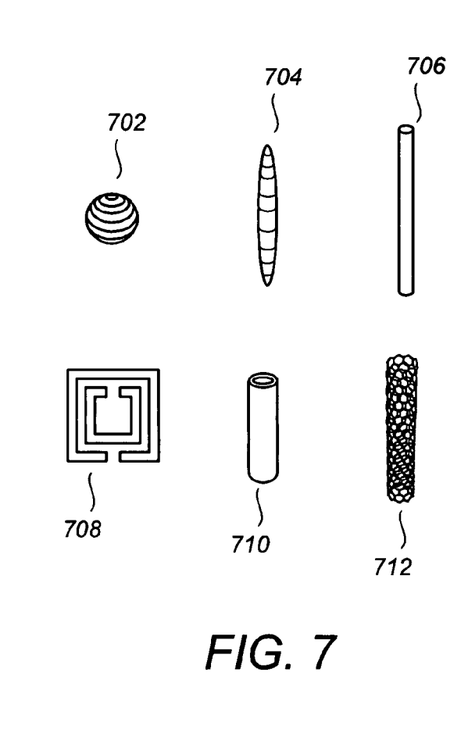
FIG. 7 illustrates examples of conductive structures that can be incorporated into the dispersion compensating material of FIG. 6 according to an embodiment.

FIG. 7 illustrates some examples of the many kinds of conductive nanostructures that can be incorporated into the composite material 602, including nanospheres 702, elongate nanoellipsoids 704, nanorods or nanowires 706, square, as shown, or circular split-ring resonators 708, nanocylinders 710, and metallic carbon nanotubes 712. Swiss roll nanostructures can also be used. In other embodiments, the composite material 602 and control signals applied thereto are similar to one or more of those described in the commonly assigned Ser. No. 11/290,685 filed Nov. 30, 2005, which is incorporated by reference herein.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while some embodiments supra are described in the context of negative index materials, the features and advantages of the embodiments are readily applicable in the context of so-called indefinite materials in which the permeability and permittivity are of opposite signs.

By way of further example, while some embodiments supra are presented in the context of closed-loop feedback control of the dispersion compensating material based on residual dispersion measurement, in other embodiments the dispersion analyzer is omitted and control of the dispersion compensating material is open-loop. Notably, in such embodiments, the dispersion compensation apparatus can optionally be placed before the dispersive medium to pre-compensate the optical signal.

By way of even further example, while some embodiments supra are presented in the context of propagation of the optical signal through the dispersion compensating material, in other embodiments the dispersion compensation can be achieved by reflection of the optical signal from the dispersion compensating material upon partial or full propagation therethrough, in a manner analogous to the way optical signals are applied to chirped FBGs. Thus, reference to the details of the described embodiments are not intended to limit their scope.

What is claimed is:

1. A method of compensating for dispersion in an optical signal having a first frequency range, comprising:
    applying the optical signal to a dispersion compensating material having a negatively refracting behavior within said first frequency range; and
    tuning the dispersion compensating material by applying a control signal thereto that varies at least one characteristic thereof associated with said negatively refracting behavior.

2. The method of claim 1, wherein said dispersion compensating material is configured such that said first wavelength range is near a resonant frequency of the dispersion compensating material but does not include said resonant frequency.

3. The method of claim 1, propagation of the optical signal through a dispersive medium and application of the optical signal to the dispersion compensating material and resulting in a compensated signal, the method further comprising:
    applying a portion of the compensated signal to a dispersion analyzer that generates a first signal at least partially representative of an amount of residual dispersion in the compensated signal; and
    varying said control signal according to said first signal in a manner that reduces the amount of residual dispersion in the compensated signal.

4. The method of claim 1, wherein said dispersion compensating material comprises an externally powered gain material, the method further comprising applying external power to said externally powered gain material for providing one of net gain and reduced loss for the optical signal upon propagation through said dispersion compensating material.

5. The method of claim 1, wherein said dispersion compensating material comprises a photonic crystal medium formed by a first dielectric material periodically patterned with a second dielectric material, the periodic pattern comprising features that are relatively small compared to a wavelength of the optical signal and configured to result in said negatively refractive behavior within said first frequency interval.

6. The method of claim 5, wherein said at least one characteristic associated with said negatively refracting behavior that is tuned by the application of the control signal comprises at least one of a dimensional characteristic of said periodic pattern and a dielectric characteristic of one of said first and second dielectric materials.

7. The method of claim 1, wherein said dispersion compensating material comprises an arrangement of electromagnetically reactive cells of small dimension relative to a wavelength of the optical signal configured to exhibit a negative effective permittivity and a negative effective permeability within said first frequency range.

8. The method of claim 7, wherein said at least one characteristic associated with said negatively refracting behavior that is tuned by the application of the control signal comprises at least one of a capacitive property and inductive property of said electromagnetically reactive cells.

9. An apparatus for dispersion compensation for an optical signal having a first frequency range, comprising:
    a dispersion compensating material having a negatively refracting behavior within said first frequency range; and
    a controller for applying a control signal to said dispersion compensating material;
    wherein at least one characteristic of the dispersion compensating material associated with said negatively refracting behavior is affected by the control signal such that the dispersion compensation is tunable according to the control signal.

10. The apparatus of claim 9, said dispersion compensating material being configured such that said first wavelength range is near a resonant frequency of the dispersion compensating material but does not include said resonant frequency.

11. The apparatus of claim 9, further comprising a dispersion analyzer positioned to receive a portion of a compensated signal resulting from propagation of the optical signal through a dispersive medium and said dispersion compensating material, said controller being coupled to the dispersion analyzer to receive a first signal at least partially representative of an amount of residual dispersion in the compensated signal, the control signal applied by said controller being at least partially based upon said first signal.

12. The apparatus of claim 9, said dispersion compensating material comprising a photonic crystal medium formed by a first dielectric material periodically patterned with a second dielectric material, the periodic pattern comprising features that are relatively small compared to a wavelength of the optical signal, wherein said at least one characteristic associated with said negatively refracting behavior that is tuned by the application of the control signal comprises at least one of a dimensional characteristic of said periodic pattern and a dielectric characteristic of one of said first and second dielectric materials.

13. The apparatus of claim 12, wherein said control signal applied by said controller to said photonic crystal medium comprises at least one of mechanical stress, mechanical strain, an electrostrictive actuation signal, a magnetostrictive actuation signal, a piezoelectric actuation signal, an electromagnetic actuation signal, an electromechanical actuation signal, and a microfluidic actuation signal, and wherein said photonic crystal comprises an externally powered gain material for providing at least one of net gain and reduced loss for the optical signal upon propagation therethrough.

14. The apparatus of claim 12, wherein said photonic crystal medium comprises one of a waveguiding slab of said first dielectric material periodically patterned with said second dielectric material and an optical fiber core of a glass material periodically patterned with holes oriented in an anti-axial direction occupied by material of a substantially different dielectric constant than said glass material.

15. The apparatus of claim 9, wherein said dispersion compensating material comprises an arrangement of electromagnetically reactive cells of small dimension relative to a wavelength of the optical signal and configured to exhibit a negative effective permittivity and a negative effective permeability within said first frequency range, and wherein said at least one characteristic associated with said negatively refracting behavior that is tuned by the application of the control signal comprises at least one of a capacitive property and inductive property of said electromagnetically reactive cells.

16. The apparatus of claim 9, wherein said dispersion compensating material comprises:
  a dielectric matrix material; and
  a population of conductive nanostructures that are substantially random with respect to at least one of size, shape, orientation, and location and that have a minor dimension less than about one fiftieth of said incident radiation wavelength;
  wherein said at least one characteristic associated with said negatively refracting behavior that is tuned by the application of the control signal comprises one of an overall dimension of the dielectric matrix material and an optical pumping level of an optical gain material disposed within said dielectric matrix material.

17. A tunable device for compensating dispersion in an optical signal propagated through a dispersive medium, the optical signal having a first frequency range, the dispersive medium having a first dispersion characteristic over said first frequency range, the tunable device comprising:
  a dispersion compensating material that exhibits a negatively refracting behavior and has a second dispersion characteristic of opposite sign and substantially greater magnitude than said first dispersion characteristic within said first frequency range; and
  means for dynamically controlling at least one property of the dispersion compensating material associated with said negatively refracting behavior, said dynamic controlling of the at least one property operatively tuning said second dispersion characteristic of said dispersion compensating material.

18. The tunable device of claim 17, wherein said dispersion compensating material is configured such that said first wavelength range is near a resonant frequency of the dispersion compensating material but does not include said resonant frequency.

19. The tunable device of claim 18, further comprising means for generating a first signal representative of an amount of residual dispersion in the optical signal upon propagation through both of said dispersive medium and dispersion compensating material, wherein said means for dynamically controlling comprises means for receiving said first signal, and wherein said means for dynamically controlling controls said at least one property in a manner that maintains said first signal at a minimum level.

20. The tunable device of claim 19, wherein said optical signal comprises a wavelength division multiplexed (WDM) signal, wherein said first frequency range corresponds to a contiguous free-space wavelength range about 10 nm wide and lying between 1500 nm-1550 nm, wherein said dispersion compensating material comprises one of a tunable photonic crystal device and a tunable arrangement of resonant cells configured to exhibit said negatively refracting behavior within said first frequency range, and wherein said second dispersion characteristic is more negative than about −2000 ps/(nm-km) within said first frequency range.

* * * * *